United States Patent [19]
Abell

[11] Patent Number: 5,636,509
[45] Date of Patent: Jun. 10, 1997

[54] FLYWHEEL ENGINE IMPROVEMENTS

[76] Inventor: Irwin R. Abell, 7360 Hwy. 95 South, Sandpoint, Id. 83864

[21] Appl. No.: 546,509

[22] Filed: Oct. 20, 1995

[51] Int. Cl.$^6$ .................................................. F02C 3/14
[52] U.S. Cl. ............................................ 60/39.35; 415/63
[58] Field of Search .......................... 415/81, 63, 175, 415/177; 60/39.34, 39.35

[56] References Cited

U.S. PATENT DOCUMENTS

| | | | |
|---|---|---|---|
| 181,478 | 8/1876 | Rector et al. | 415/63 |
| 1,256,674 | 2/1918 | Fottinger. | |
| 2,465,856 | 3/1949 | Emigh. | |
| 2,474,685 | 6/1949 | McCollum. | |
| 2,679,295 | 5/1954 | Parsons. | |
| 2,840,341 | 6/1958 | Hudyma | 415/63 |
| 2,895,259 | 7/1959 | Beckett. | |
| 2,927,647 | 3/1960 | Serriades. | |
| 3,484,172 | 12/1969 | Reed. | |
| 3,768,926 | 10/1973 | Pegg et al. | |
| 3,804,549 | 4/1974 | Kellenbarger. | |
| 3,930,744 | 1/1976 | Theis, Jr. | 415/63 |
| 4,024,705 | 5/1977 | Hedrick. | |
| 4,413,860 | 11/1983 | Prescott. | |
| 5,282,356 | 2/1994 | Abell | 60/39.35 |

FOREIGN PATENT DOCUMENTS

| | | | |
|---|---|---|---|
| 91303 | 5/1983 | Japan | 415/81 |

OTHER PUBLICATIONS

"New Rotary In The Club," *Popular Mechanics*, Jan. 1994, p. 16.

"Emerging Technologies for the Supercar," *Popular Science*, Jun. 1994, pp. 95–101.

"New Age Of The Electric Car," *Popular Mechanics*, Feb. 1994, pp. 38–40.

"Chrysler's Rocket Builder?", *Business Week*, Jan. 10, 1994, p. 57.

"Chrysler takes the fast lane," *U.S. News & World Report*, Feb. 28, 1994, p. 52.

*Primary Examiner*—Charles G. Freay
*Attorney, Agent, or Firm*—Wells, St. John, Roberts, Gregory & Matkin, P.S.

[57] ABSTRACT

Improvements in a flywheel engine are described which includes a flywheel with non radial propulsion units for generating thrust by combustion to rotate the flywheel in a first direction about a flywheel axis. A drive shaft mounts the flywheel for rotation about the flywheel axis within a housing that completely encloses the flywheel. A turbine is also mounted within the housing. It includes turbine blades positioned to react against thrust from the propulsion units and rotate in a second direction opposite to rotation of the flywheel. A transmission is connected to the turbine for producing torque responsive to rotation of the turbine.

8 Claims, 6 Drawing Sheets

5,636,509

FLYWHEEL ENGINE IMPROVEMENTS

TECHNICAL FIELD

The present invention relates to recovery of heat and pressure energy conservation in rocket powered flywheel engines.

BACKGROUND OF THE INVENTION

In my U.S. Pat. No. 5,282,356, I disclosed a novel rocket powered flywheel engine, in which a flywheel is driven by rocket engines. While the engine is quite efficient, there is a notable loss of energy in the form of heat and pressure from the rocket ignition.

In the patent, a simple housing was provided to contain the rocket exhaust, and direct it outward through discharge ports. No disclosure was made of any apparatus for increasing overall efficiency, since it was considered at the time that the engine would operate with significantly improved efficiency over the conventional internal combustion engine. The primary thrust of the patent is the engine's basic operation. However, it has since been discovered that further improvements in efficiency of the engine can be gained by utilizing energy that would otherwise be lost in the exhaust from the engine.

Rocket engines are currently in use for lifting huge payloads at extreme thrust and acceleration into orbit around the earth. The difficulty with jets and rockets in relation to land vehicles, however, is that they are reactive engines and work with thrust rather than compression and drive, and that a rocket is typically useful only for a short duration. Even so, jet and rocket engines are significantly more efficient than internal combustion engines.

It is always desirable to maximize the efficiency from any fuel burning engine, to minimize fuel loss and pollution. Thus it becomes desirable to make use of the heat energy expended by such engines.

U.S. Pat. No. 3,804,549 to Kellenbarger discloses an internally propelled flywheel engine. The flywheel is driven by thrust from exhaust ports leading outwardly from ignition chambers formed within the flywheel body. The engine is arranged with valving such that the exhaust gases are not constantly vented but are valved, as are intake and ignition portions of the operational cycle. It is also stated that this engine may make use of external combustion with pressurized gases being delivered through piping to various exhaust jets for the purpose of forcibly rotating the flywheel. Heat and friction loss through the external combustion system results in reduced efficiency.

While efficiency greater than that obtainable by conventional internal combustion engines may be available in the Kellenbarger engine, there still remains the need for an engine using thrust for driving a flywheel that utilizes the maximum potential energy of the fuel, and that is also efficient in construction and that may be easily adapted for different driving requirements.

It is a primary object of the present invention, in keeping with my earlier patent, to introduce advanced technologies used in space industry, into practical domestic industrial applications, in a unique propulsion driven flywheel engine, with improvements enabling maximum utilization of potential energy from the thrust producing fuel. The above and still further objects and advantages of the present engine improvements will become more apparent upon reading the following description which, taken with the accompanying drawings, disclose preferred embodiments of the present invention.

BRIEF DESCRIPTION OF THE DRAWINGS

Preferred and alternate embodiments of the present invention are illustrated in the accompanying drawings in which.

DETAILED DESCRIPTION OF THE PREFERRED EMBODIMENTS

Figure 1:
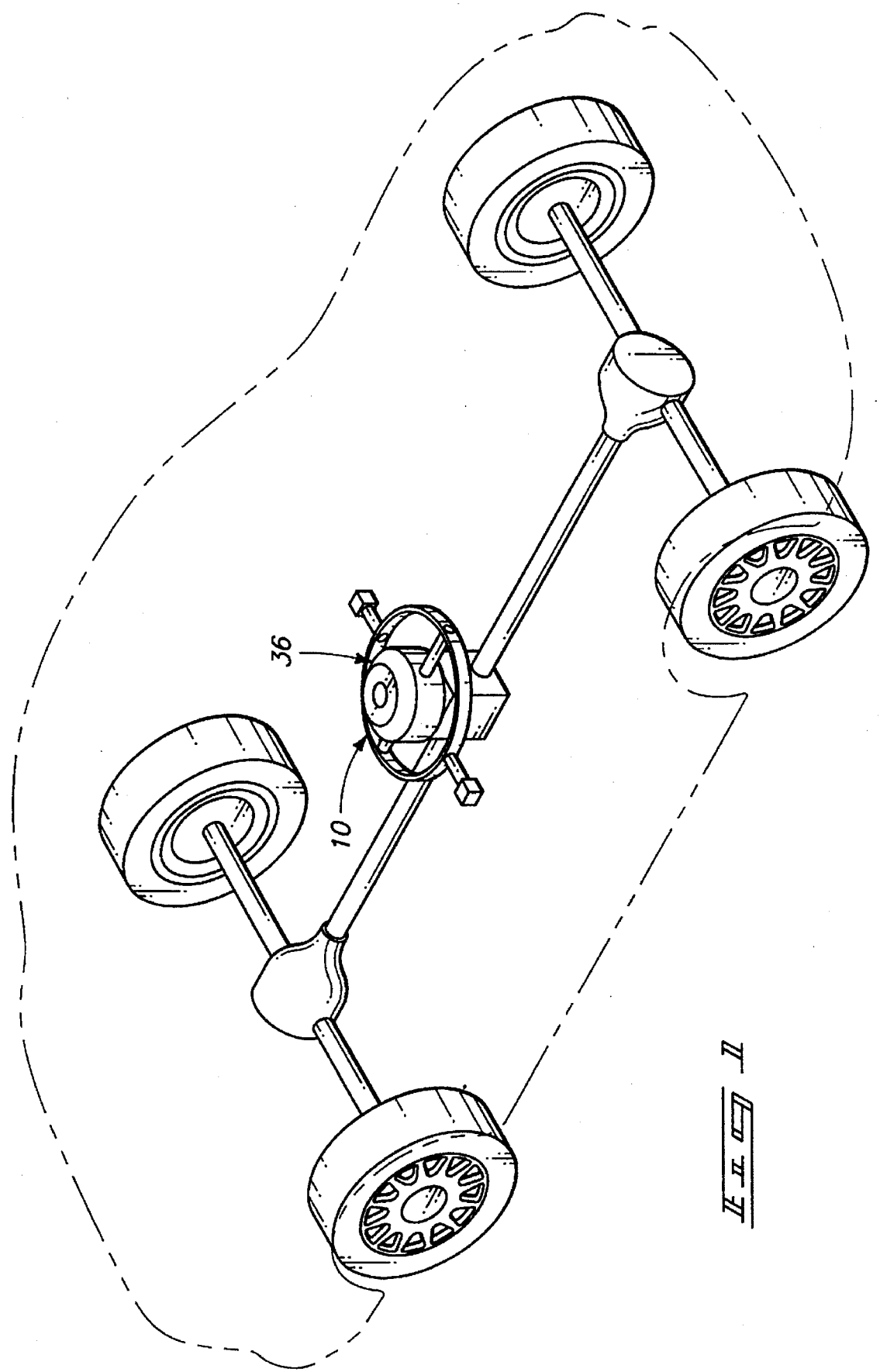
FIG. 1 is a diagrammatic representation exemplifying use of the present engine in a land vehicle.

This disclosure of the invention is submitted in furtherance of the constitutional purposes of the U.S. Patent Laws "to promote the progress of science and useful arts" (Article 1, Section 8).

A flywheel engine incorporating features of the present invention is illustrated in the accompanying drawings and is generally designated therein by the reference numeral 10. The flywheel engine 10, is as shown in the drawings and as disclosed in my prior U.S. Pat. No. 5,282,356, which is incorporated by reference in the present application.

Figure 2:
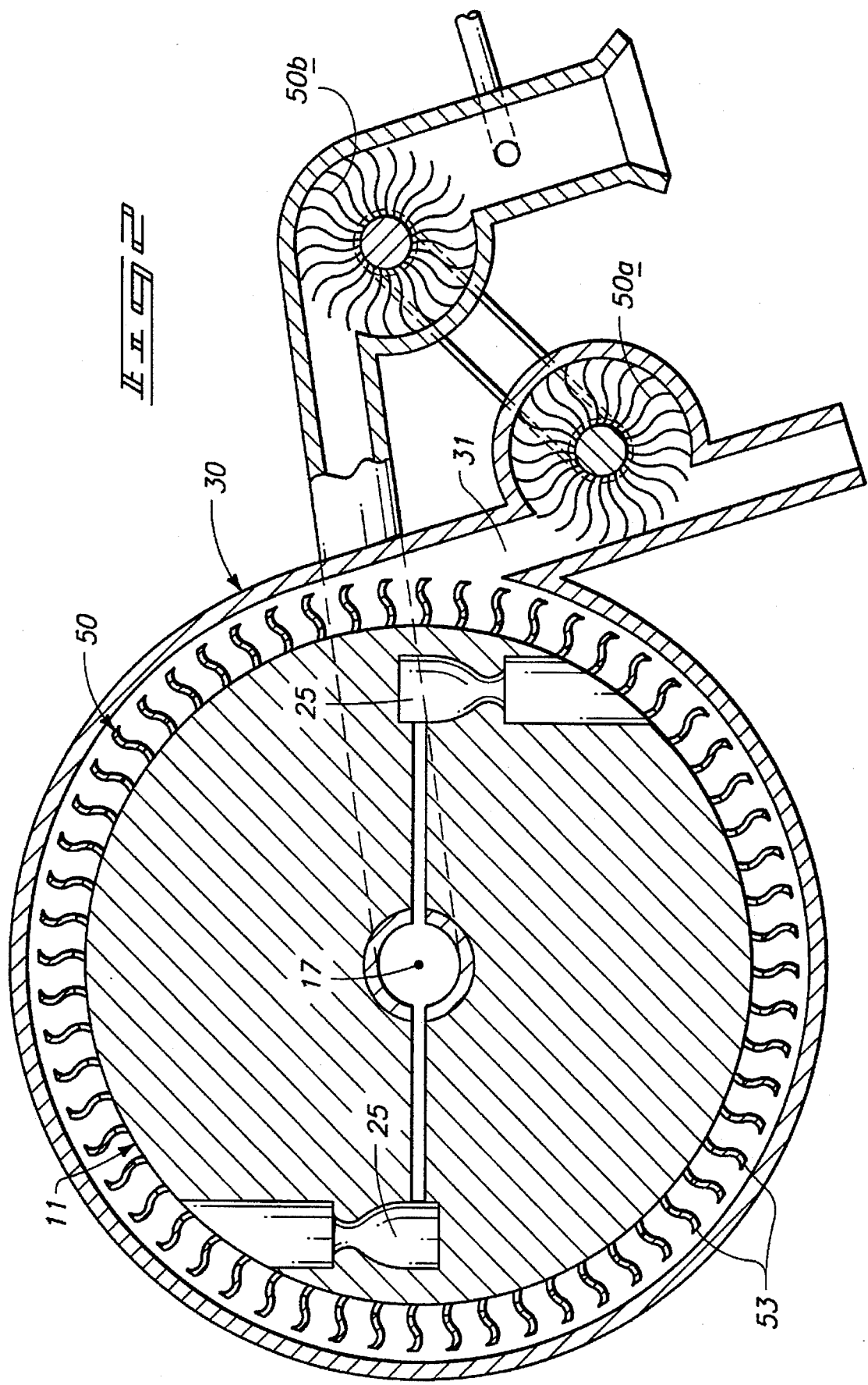
FIG. 2 is a transverse sectional view of the first preferred form of the invention.
Figure 4:
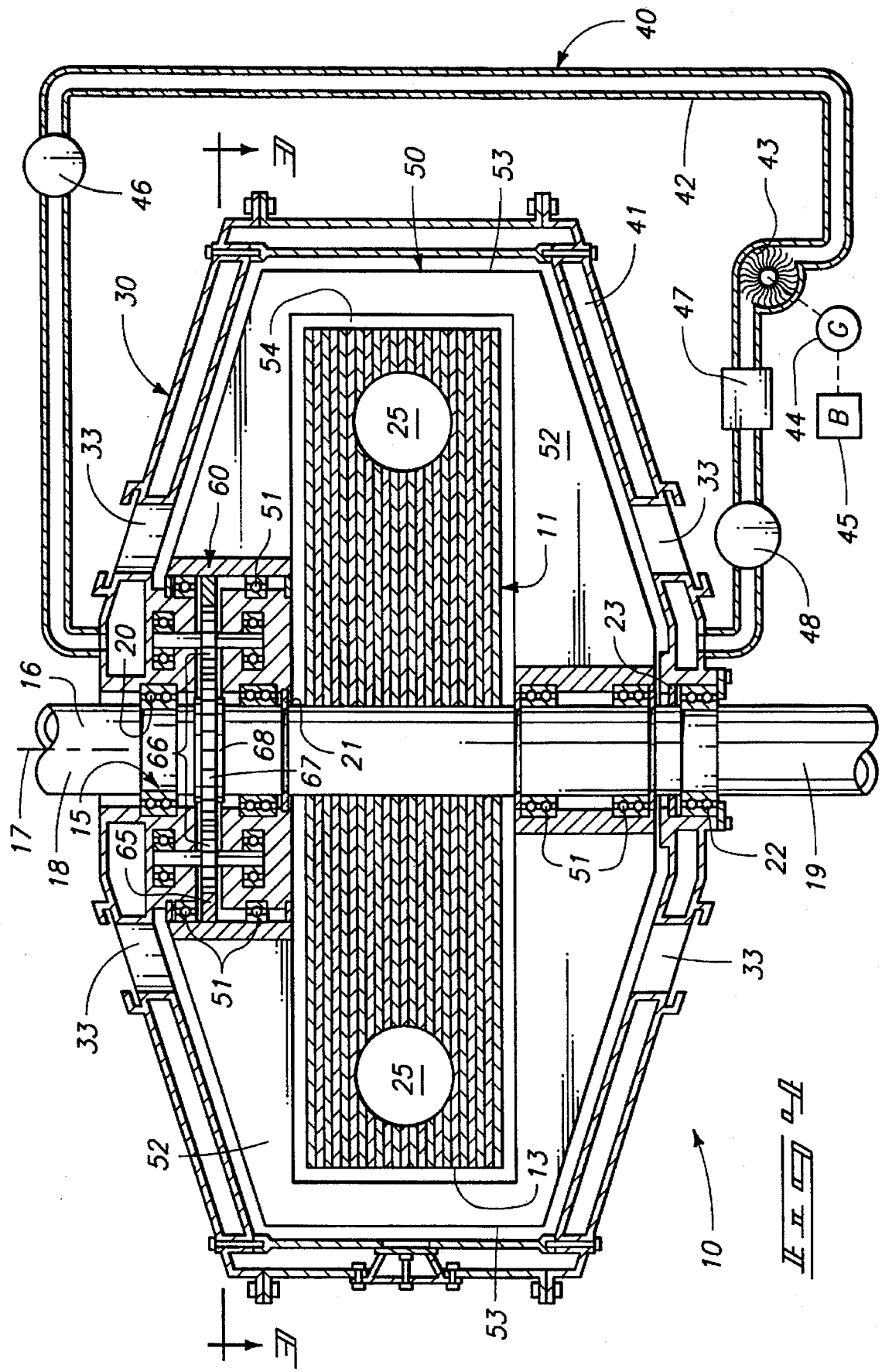
FIG. 4 is a longitudinal sectional view of the second preferred form with addition of a heat recovery and energy conversion features.

In general, the engine 10 includes an internal laminated flywheel 11 having a substantially circular peripheral edge surface 13 (FIG. 4). Means is provided at 15 mounting the flywheel body for rotation about the rotational flywheel axis 17 (FIG. 2). Means 15 includes a central elongated drive shaft 16 extending from a top end 18 to a bottom output shaft end 19. The top end of the drive shaft 16 is rotatably journaled by top bearings 20 and top seals 21 seal the bearing area in relation to a housing 30 that encloses the flywheel body and rotatably mounts the drive shaft 16.

Bottom bearings 22 are also provided to rotatably journal the bottom shaft end. The bottom bearings 22 are shown diagrammatically in FIG. 4, protected by bottom seals 23 from the housing interior. Further details of such bearing and mounts can be found in my above incorporated patent, as well as details concerning presently preferred fuel and air intake, nozzle construction, and combustion system. It should also be understood that the bearings and seals may be standard conventional bearing and sealing devices and will therefore not be described in great detail herein.

The flywheel 11 (FIG. 4) is made up of many laminations formed by disks with adjoining planar surfaces that are substantially perpendicular to the flywheel axis. The disks are shaped to house non-radial, directionally oriented propulsion units such as jet or rocket nozzles 25, similar or identical to those disclosed in my above referenced patent. The propulsion units are used to produce a thrust to rotate the flywheel in a first direction of rotation. Features of the flywheel and thrust generating nozzles may also be similar or identical with those described in my referenced patent, with the possible exception that the cooling ducts and cooling system disclosed therein may be supplemented by a heat energy conversion system 40 disclosed below.

In the present improved engine, a preferred form of stationary engine housing 30 encloses the entire flywheel 11 within its confines to protect the balanced components within the housing and to provide at least one controlled exhaust opening 31 for discharging exhaust from the propulsion units in the flywheel body. The opening 31 may, in turn, lead to substantially conventional exhaust collection mechanisms (not shown) for delivering the exhaust gases to a final discharge port. The housing 30 in one preferred form may include the heat absorption portion of a heat conversion means 40 (described below) for reclaiming heat energy from within the housing and converting such energy to a form suitable for storage or for supplementing the torque developed by the rotating flywheel.

One or more intake openings 33 (FIG. 4) may be provided in the housing 30 for receiving ambient air to be used to mix with and cool the discharge gasses from the jet or rocket nozzles. The intake openings 33 are preferably situated radially between the discharge opening 31 and the drive shaft 16.

The heat conversion means 40 (FIG. 4) includes coolant receiving and recirculating chambers 41 (FIG. 4) formed within the housing 30 for circulating a coolant such as water and antifreeze through the housing 30. The circulating coolant will absorb much of the heat transmitted by conduction to the housing from burning gasses discharged from the flywheel, and will therefor acquire much of the energy that would otherwise be lost in heat expelled through the exhaust system.

The heated coolant is cycled from the housing 30 (FIG. 4) through a coolant circuit 42 which may be provided with a known form of steam or water pressure turbine 43 connected to a generator 44 or other appropriate energy conversion device. The turbine 43 functions to convert energy of the steam or heated, pressurized water to mechanical (rotary) energy, which in turn, may be converted by a generator 44 to electrical energy to charge a battery 45. Stored electrical energy from the battery 45 may be used to drive electrical systems that may include electric motors (not shown) used to power starters or rocket igniters or other systems associated with the engine and vehicle.

Flow through the circuit may be controlled by provision of a thermostat valve 46 that will allow flow to the turbine. Return flow of fluid from the turbine may be directed to a condenser 47. A conventional pump 48 may be provided to assist flow back to the engine housing.

In consideration of the normally high operating temperatures, additional cooling of the flywheel may be provided as described in my above referenced patent. However, the heat conversion means 40 described above may be used to obtain greater utilization of the potential energy of the fuel, resulting in overall higher operational efficiency of the engine 10 by reducing the heat loss ordinarily observed in common rocket or jet engine systems.

As stated in my above referenced application, appropriate air-fuel mixture diffusion will create a flame front at approximately 4,300 feet per second with the vapor burning at approximately 3,500 degrees F. An attainable volumetric air-to-fuel ratio of approximately 53 to 1 produced through the forced air induction and nozzle relationship, will facilitate the near stoichiometric combustion. Utilization of the residual heat from combustion as described above should therefor substantially increase the overall efficiency of the engine without interrupting exhaust gas flow through the housing.

In my above referenced patent, it is suggested that a conventional exhaust driven turbine might be utilized, driven by exhaust gases in the manner of conventional turbines using exhaust gases from internal combustion engines, to supply air under pressure to the fuel/air supply.

While the above suggested system could well function to improve air and fuel intake, additional benefit may be directly derived from the thrust of the jet or rocket nozzles within the engine housing itself to improve efficiency. This is accomplished within the housing, rather than downstream in the exhaust flow, by provision of the internal turbine 50 shown in FIGS. 2–6.

As shown in FIG. 4, the turbine 50 is rotatably mounted to the drive shaft 16 by bearings 51. Turbine blades 52, formed of heat resistant material common to exhaust driven turbines, extend substantially radially outwardly from the bearing mounts to ends 53 that axially span and bridge the flywheel perimeter. An annular space 54 is thus formed within the blades 52 to receive the flywheel, so no physical contact is made between the flywheel and turbine blades.

Thrust from the jet or rocket nozzles within the flywheel body is directed against the turbine blades, causing the turbine to rotate in a second direction, opposite to the first direction of rotation of the flywheel. The torque of the turbine in reaction to the forcefully discharged gasses from the nozzles can be transferred to the drive shaft 16, as will be discussed below. Also, the opposed rotary motion of the turbine serves to reduce the overall gyroscopic effect of the flywheel, a benefit not possible with downstream conventional exhaust turbine systems.

Further, thrust from the jet or rocket nozzles occurs at a substantial radial distance from the rotational axis of the turbine, so maximum torque is produced by the turbine blades 52. Again this is an advantage over conventional exhaust gas operated turbines which typically have turbine blades arranged about a relatively small radius.

Inward sections of the individual turbine blades 52 may be substantially radial, as the blade sections near the drive shaft 16 are not in the discharge path of jet or rocket nozzles. Instead, these blade sections may be used to receive intake air, provided through inward housing intake openings 33. The rotating blades will draw air in through the openings 33, then direct it radially outward within the housing to mix with and the exhaust gasses from the nozzles 25. Introduction of ambient air will assist more complete combustion of any unburned fuel.

Further, the radial blades, and the arrangement of the intake and discharge openings causes the turbine to act as a radial compressor, forcing exhaust gasses outward under pressure. Such pressurized fluid flow may be utilized to drive a second stage turbine 50a (FIG. 2), outward of the housing. The second stage turbine 50a may be similar to conventional external exhaust flow type turbines in current use in the automotive industry. It may function as the turbine disclosed in my above referenced patent, to operate a blower 50b for assisting fuel and air intake. It may also operate a generator or alternator, for ignition, heat regeneration, or for other useful purposes.

Referring again back to the internal turbine 50, the number and peripheral shape of the turbine blades 52 may vary according to flywheel diameter, thickness, jet or rocket size, fuel and thrust characteristics, and other considerations evolved from observation of engine functions and dimensions. Given such parameters, design of the turbine blades 52 is believed to be well within the capability of one of ordinary skill in the field of turbine design.

It is noted that the turbine 50 rotates independently of the flywheel 11, in response to thrust directed against the turbine blades 52 from the jet or rocket engines. The mechanical rotational energy developed in the turbine 50 is converted to torque for storage or transfer to the drive shaft 16 through a transmission means 60, examples of preferred forms being described below.

Figure 3:
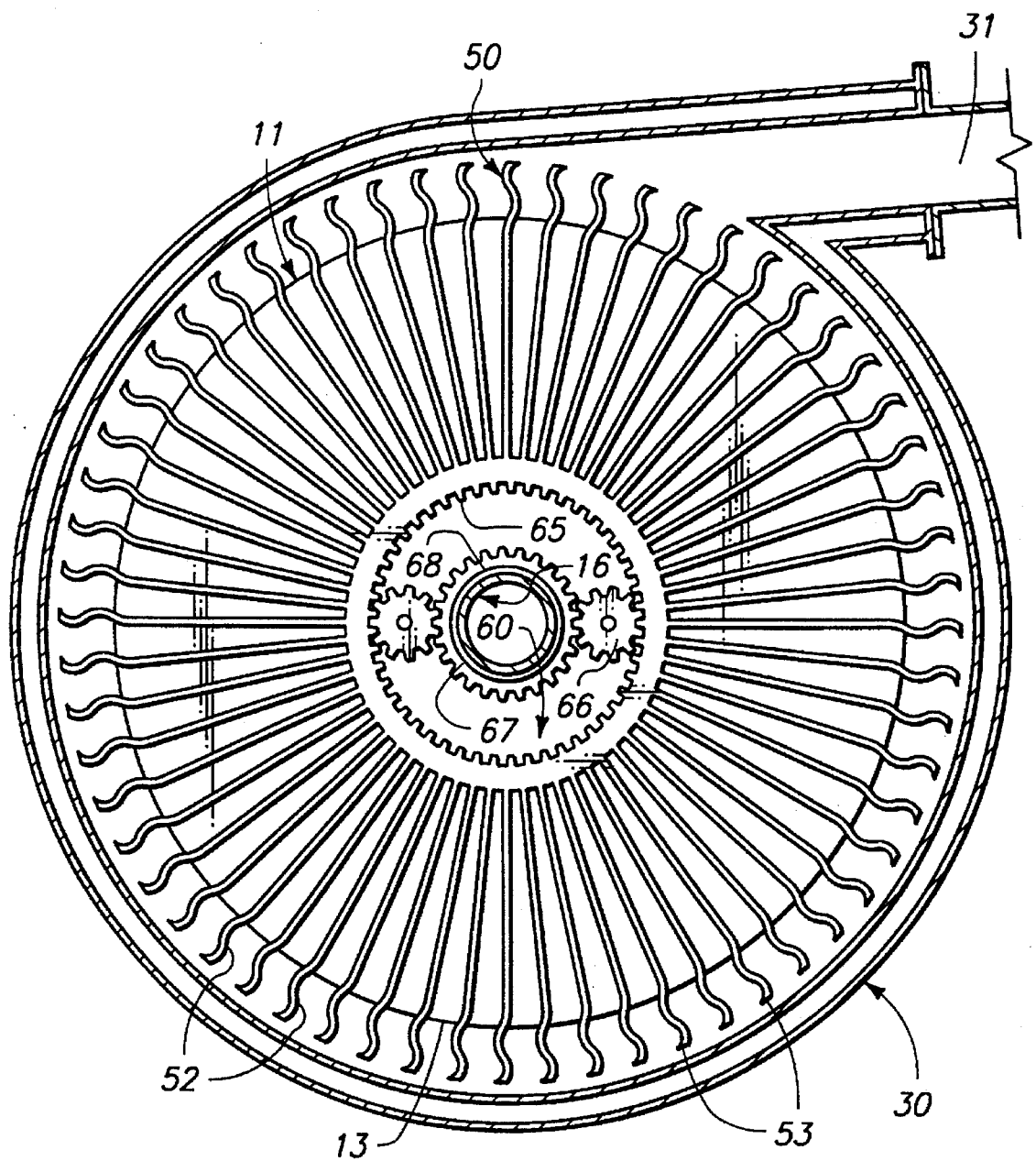
FIG. 3 is a transverse sectional view of a second preferred form of the invention, taken substantially along line 3—3 in FIG. 4.

In a first preferred form, as shown in FIGS. 3 and 4, the transmission means 60 includes a planetary gearing system for transferring torque from the turbine blades 52 to the drive shaft 16. Here, a ring gear 65 is mounted to the turbine blades 52 concentric with the rotational axis.

Gear teeth on the ring gear mesh with two or more planetary gears 66, which in turn mesh with a central sun or drive gear 67 affixed to the drive shaft 16. Rotation of the ring gear 65, transmitted through the planetary gears 66, will produce rotation of the drive shaft 16 in the same direction as produced by the flywheel.

The gearing ratio is such that one revolution of the ring gear 65 (and attached turbine blades 52) will produce more than one revolution of the drive shaft 16 as caused by the flywheel. This arrangement is preferred so that torque transmitted to the drive shaft 16 produced through the turbine blades will add to the torque and resulting revolutions of the drive shaft 16 produced by the flywheel (which may be in a direct driving relationship to the drive shaft 16 as shown).

A freewheel clutch 68 similar to those used in bicycle drives is advantageously mounted between the gear 67 and drive shaft 16. The turbine will thus freewheel unless it is being driven by rocket or jet thrust to rotate the gear 67 at a speed greater than the rpm of the drive shaft.

Figure 5:
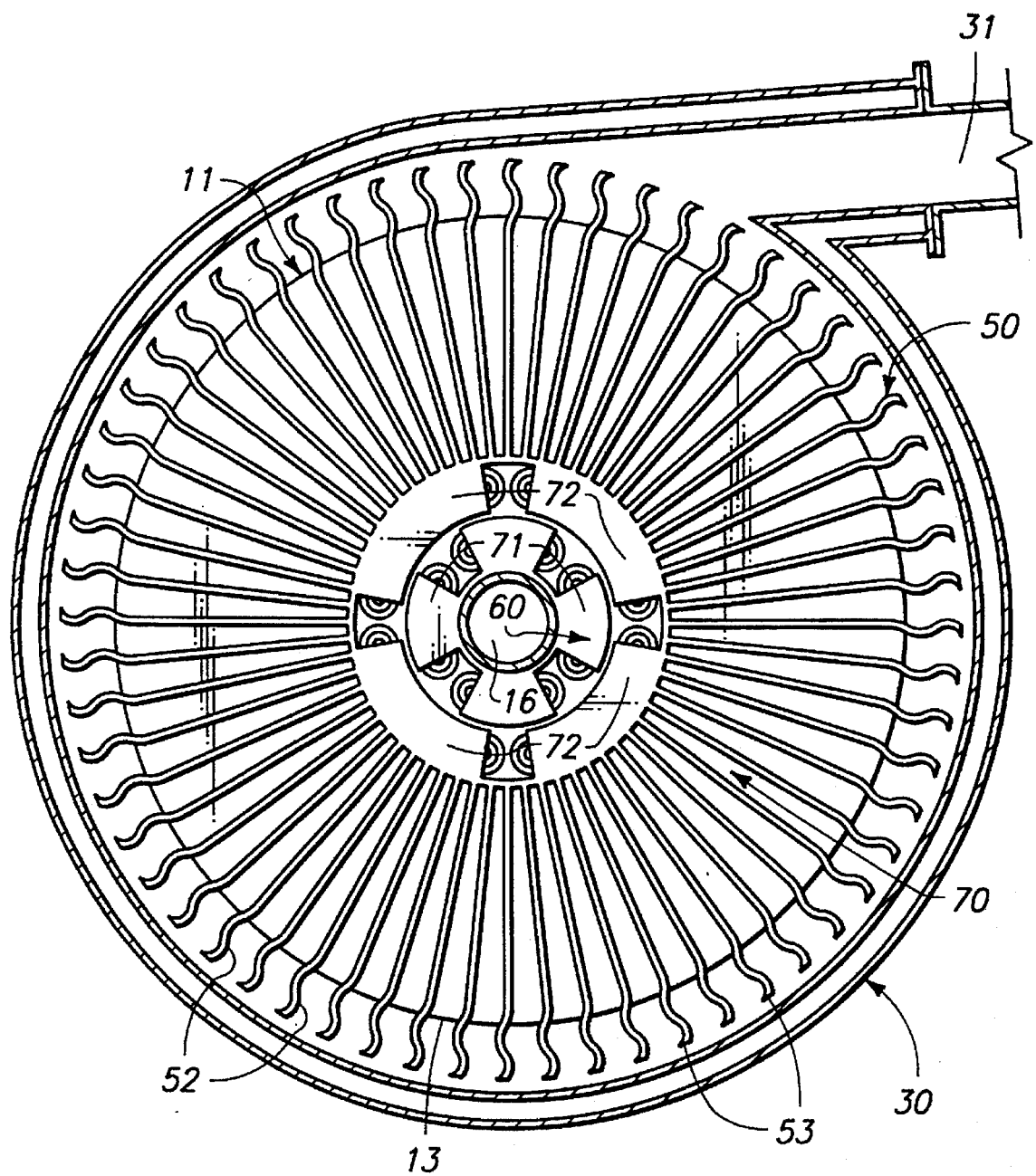
FIG. 5 is a transverse sectional view of a third preferred form of the invention.

FIG. 5 illustrates another form of transmission means 60 that has variable control advantages. Here, a set of magnetic fields are produced by a means 70 including variable electromagnets with reversible polarity. Means 70 is used as a coupling device between the drive shaft 16 and the turbine blades 52 to produce electrical energy upon rotation of the turbine. One set of magnets 71 is mounted in fixed relation to the drive shaft 16, and another set 72 is mounted in concentric relation to magnets 71 and fixed to the turbine blades 52. Though not shown, it is also feasible that the magnets 71 be mounted to the housing and thus be in a stationary position relative to the rotating magnets. In this arrangement, the turbine will function independently of the flywheel to generate electricity during operation, for battery storage or other uses, without creating any drag on the drive shaft 16.

Polarity of the magnets may be switched so the means 70 may function either as a coupling device, effectively coupling the turbine to the drive shaft 16, or as a torque transmission device. Operating as a coupling device the magnetic poles attract. As a torque transmission device, the magnetic poles are switched to repel. Thus control over the turbine and flywheel output can be controlled by the polarity of the magnetic fields. Exchange of energy through the flux lines of the magnetic fields of the drive shaft magnets 71 and the turbine magnets 72 allows added control over the efficiency of the output of the engine. For example, when the jets or rockets are inoperative and the flywheel is using stored kinetic energy for rotation, no thrust is available to turn the turbine 50. At this time voltage demand may be switched off, resulting in zero power demand simultaneously as the turbine 50 slows to a stop. The circuit may remain open in this setting until the jets or rockets are again energized. At that time, the circuit can be closed and brought back to a desired maximum demand, creating a maximum desired drag on the turbine 50 as it reaches top rotational speed. Of course the electricity generated during this operation may be stored.

Operating as a motor, the motor generator means 70 may be used in starting the engine, eliminating the need for a separate starter motor as disclosed in my above incorporated patent.

The electrical circuitry of the coupling device between the flywheel output and the turbine output can be of various designs depending on the desired method of using the engines kinetic output. The design method can incorporate the housing body of the engine for a magnetic holding means as well as the flywheel drive shaft and the turbine. The interchange of electrical energy incorporating EMF and CEMF can change the means from the different magnetic fields from a motor to a generator or a transmission. Thus the counter rotation of the flywheel and turbine within the magnetic means of the housing creates the ability to produce either drive shaft torque output or an EMF or with appropriately conventional electrical switching devices both torque and EMF, simultaneously adding to the efficiency of the engine.

Figure 6:
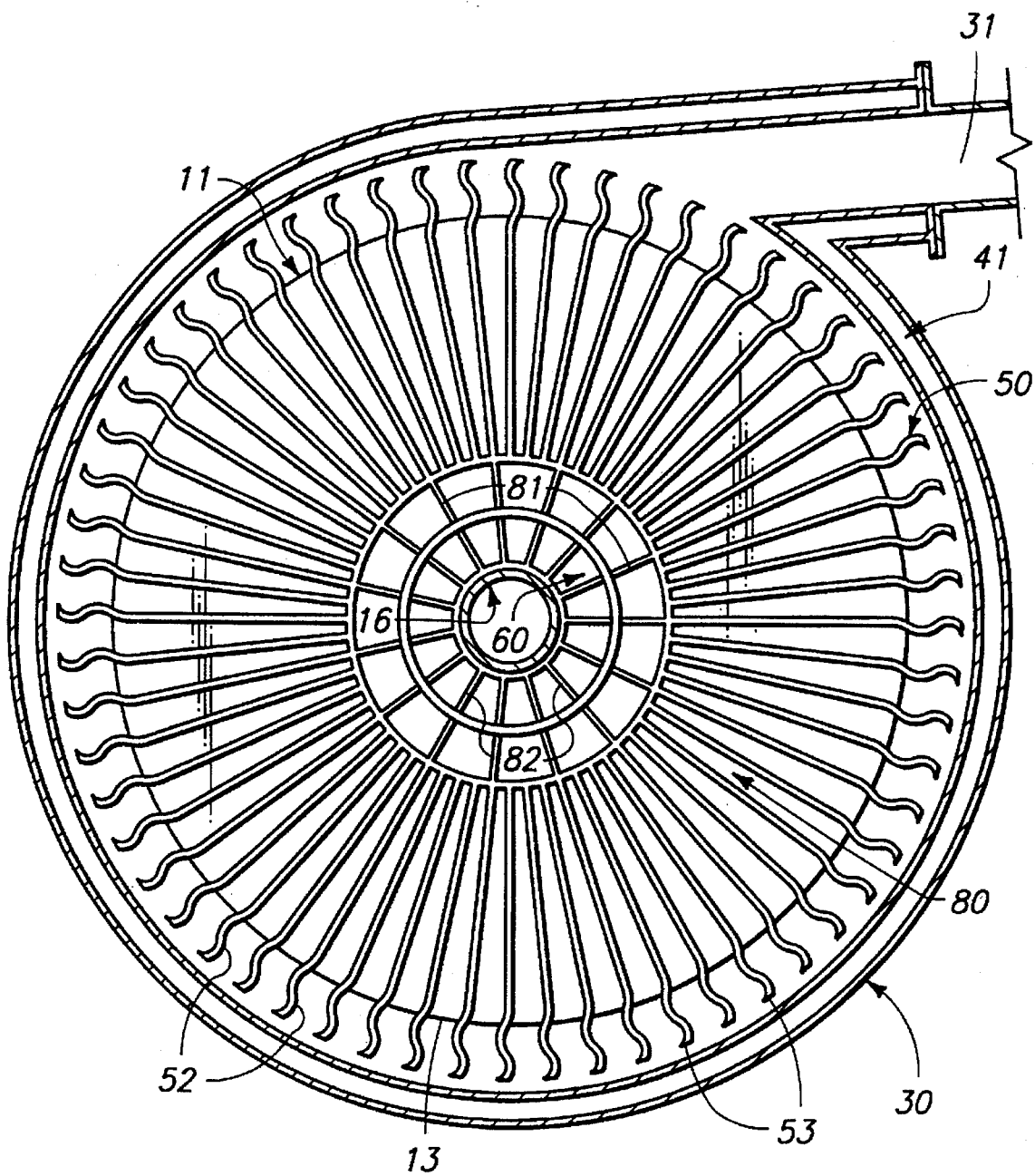
FIG. 6 is a transverse sectional view of a fourth preferred form of the invention.

FIG. 6 diagrammatically shows transmission means 60 as a conventional fluid coupling or torque converter 80. Here the turbine 50 may be secured to an impeller 81 which may be fluid coupled to a conventional torque converter turbine 82 on the drive shaft 16. A stator (not shown) may also be used in this embodiment if torque conversion is desired. The arrangement of fluid, impeller and turbine blades are designed so that supplementary torque is applied to the drive shaft in addition to that supplied by the flywheel when the rockets or jets are in operation. In addition to the fluid coupling, known forms of automatic transmission gearing (not shown) may also be used between the fluid coupling or torque converter to further control application of torque to the drive shaft.

Operation of the invention begins with the starting procedures which, depending upon the initial size of the flywheel body, may be initiated by a starting system as disclosed in my above referenced patent. Alternatively, starting may be initiated using the combined motor and generator (in the motor mode). Torque applied to the drive shaft from the starting motor will initially overcome inertia of the flywheel body and begin rotation thereof to a starting speed. At this time, the air and fuel supply will become operational and ignition may be initiated to shift driving forces from the starting components to the jet or rocket units.

Pressurized air and fuel will be received through the fuel supply into the jet or rocket units, where activated igniter plugs (as shown in my referenced patent) will ignite the fuel and air mixture, causing combustion and extremely rapid expansion of the gases which, in turn, will be expelled through the nozzles 25. A controlled thrust is thus exerted on the flywheel body to increase the rpm.

The speed of rotation will increase until a maximum desirable rpm is reached. The rockets or jet propulsion units will then be fired only intermittently to maintain the rpm within a preferred selected operational range depending upon the torque demanded and the diameter of the flywheel body. Frequency of operation for the propulsion units will, of course, increase with increased load or resistance applied to the output of the central shaft 16. Such controls are well within the ordinary skill of engine ignition system designers.

Energy from the thrust of the propulsion units is stored in the form of kinetic energy in the rotating flywheel body. The mass of the body rotating at high speed represents a substantial amount of stored kinetic energy that may be converted to purposes of driving various forms of vehicles.

As the expanding gasses are exhausted through the nozzles, creating thrust to drive the flywheel, that same thrust is directed against the blades 52 of the turbine 50, causing the turbine to rotate in an opposite direction on the drive shaft. The selected transmission means 60 will operate at this time, reclaiming a substantial portion of the thrust and converting it to mechanical energy which may be used to supplement the torque applied to the drive shaft or to create electrical energy to be stored in a battery for future use. Efficiency of the engine is thereby improved substantially.

Further, as the housing heats due to the combustion process taking place, a substantial amount of the accumulating heat energy may be collected and converted to mechanical energy using the heat conversion system 40. This also results in increased operational efficiency of the engine.

An additional advantage of the flywheel mechanism is the stabilization or gyroscopic effect that the rotating flywheel body has. This can be used to horizontally stabilize vehicles such as automobiles for purposes in cornering. Any excess or undesirable gyroscopic forces are canceled by counter rotation of the turbine 50. In fact, the speed and weight of the turbine 50 may be selected to entirely cancel the gyroscopic effect of the flywheel if so desired.

A further advantage in use of the turbine 50 is found in the ambient air intake and discharge using the intake openings 33 and the radial portions of the turbine blades 52. Air is drawn into the housing by the rotating turbine blades during operation of the jet or rocket units, and is forcefully moved radially outward in the housing where it may mix with the burning gasses, creating more complete combustion. The pressurized exhaust gasses are then directed through the exhaust opening 31 where it may be used to drive the second stage turbine 50a to force air and fuel into the engine.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A flywheel engine, comprising:
   a flywheel including non radial propulsion units for generating thrust by combustion to rotate the flywheel in a first direction about a flywheel axis;
   a drive shaft mounting the flywheel for rotation about the flywheel axis;
   a housing enclosing the flywheel;
   a heat conversion means for reclaiming heat energy from within the housing and converting such energy to a form suitable for storage or for supplementing the torque developed by the rotating flywheel;
   a turbine within the housing including turbine blades positioned to react against thrust from the propulsion units and rotate in a second direction opposite to rotation of the flywheel; and
   transmission means connected to the turbine for producing torque responsive to rotation of the turbine.

2. A flywheel engine, as claimed by claim 1 wherein the transmission means includes a planetary drive connecting the turbine to the drive shaft for transmitting torque from the turbine to the drive shaft.

3. A flywheel engine, as claimed by claim 1, wherein the turbine includes turbine blades with substantially radial sections located adjacent the drive shaft and wherein the housing includes an ambient air intake adjacent the drive shaft, and an exhaust opening radially outward of the ambient air intake.

4. A flywheel engine, as claimed by claim 1 wherein the turbine is mounted to the drive shaft for coaxial rotation with the flywheel.

5. A flywheel engine, as claimed by claim 1 wherein the turbine is mounted to the drive shaft for coaxial rotation with the flywheel with bearing mounts on opposite axial sides of the flywheel, and including a recess receiving the flywheel.

6. A flywheel engine, comprising:
   a flywheel including non radial propulsion units for generating thrust by combustion to rotate the flywheel in a first direction about a flywheel axis;
   a drive shaft mounting the flywheel for rotation about the flywheel axis;
   a housing enclosing the flywheel;
   wherein the housing includes an ambient air intake opening adjacent the drive shaft, and an exhaust opening radially outward of the intake opening;
   a turbine within the housing including turbine blades positioned to react against thrust from the propulsion units and rotate in a second direction opposite to rotation of the flywheel; and
   transmission means connected to the turbine for producing torque responsive to rotation of the turbine.

7. A flywheel engine, as claimed by claim 6 wherein turbine is mounted by bearings to the drive shaft on opposed axial sides of the flywheel, and includes an annular space formed within the turbine to receive the flywheel, so no physical contact is made between the flywheel and turbine.

8. A flywheel engine, comprising:
   a flywheel including non radial propulsion units for generating thrust by combustion to rotate the flywheel in a first direction about a flywheel axis;
   a drive shaft mounting the flywheel for rotation about the flywheel axis;
   a housing enclosing the flywheel;
   a turbine within the housing including turbine blades positioned to react against thrust from the propulsion units and rotate in a second direction opposite to rotation of the flywheel;
   at least one set of magnets mounted to the turbine, and another set mounted adjacent the one set for producing an electrical effect in response to rotation of the turbine;
   transmission means connected to the turbine for producing torque responsive to rotation of the turbine.

* * * * *